No. 813,496. PATENTED FEB. 27, 1906.
E. E. HIGGINS.
DEVICE FOR LEADING ANIMALS FROM BURNING BUILDINGS.
APPLICATION FILED FEB. 20, 1905.
3 SHEETS—SHEET 1.
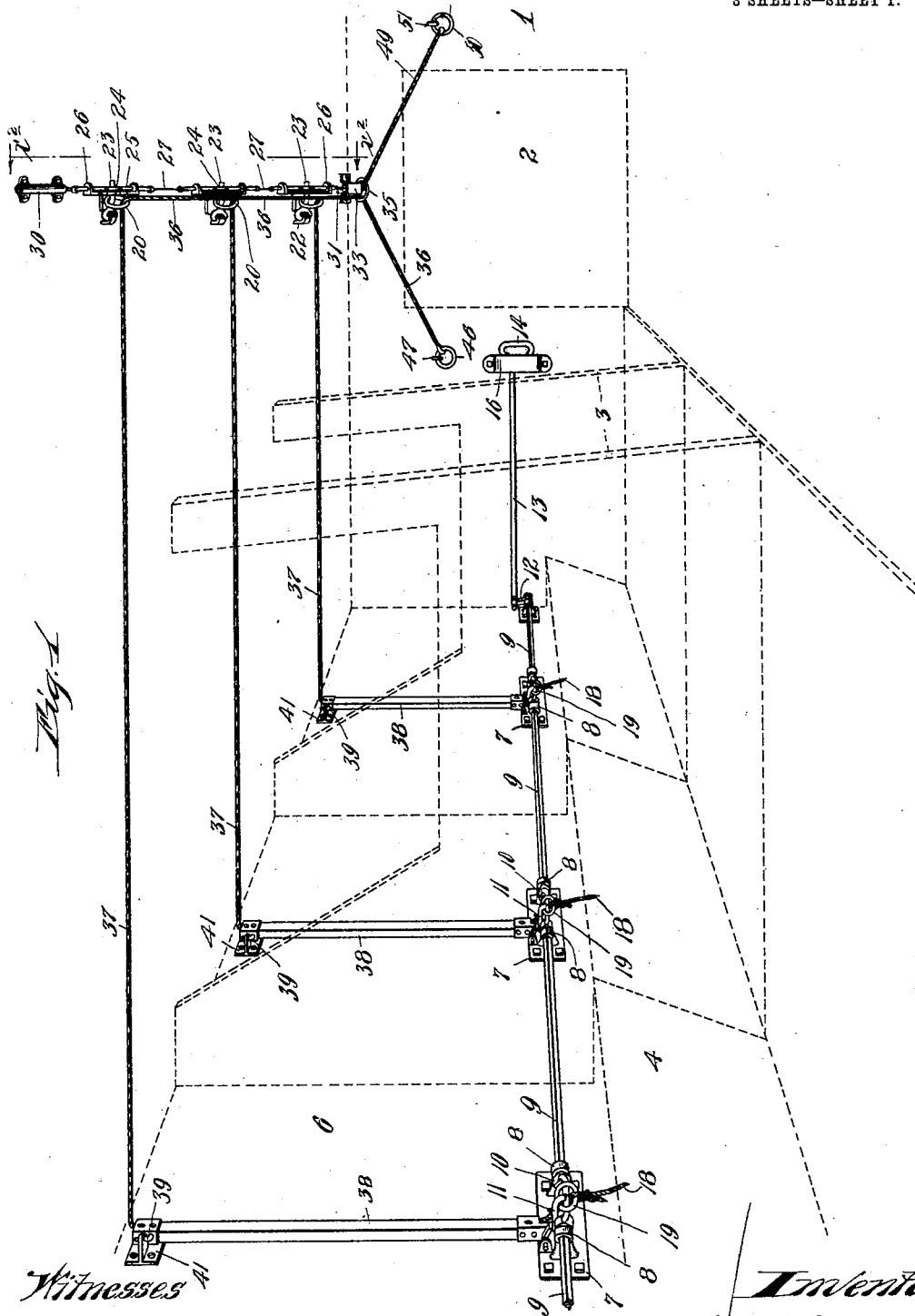

No. 813,496. PATENTED FEB. 27, 1906.
E. E. HIGGINS.
DEVICE FOR LEADING ANIMALS FROM BURNING BUILDINGS.
APPLICATION FILED FEB. 20, 1905.
3 SHEETS—SHEET 2.
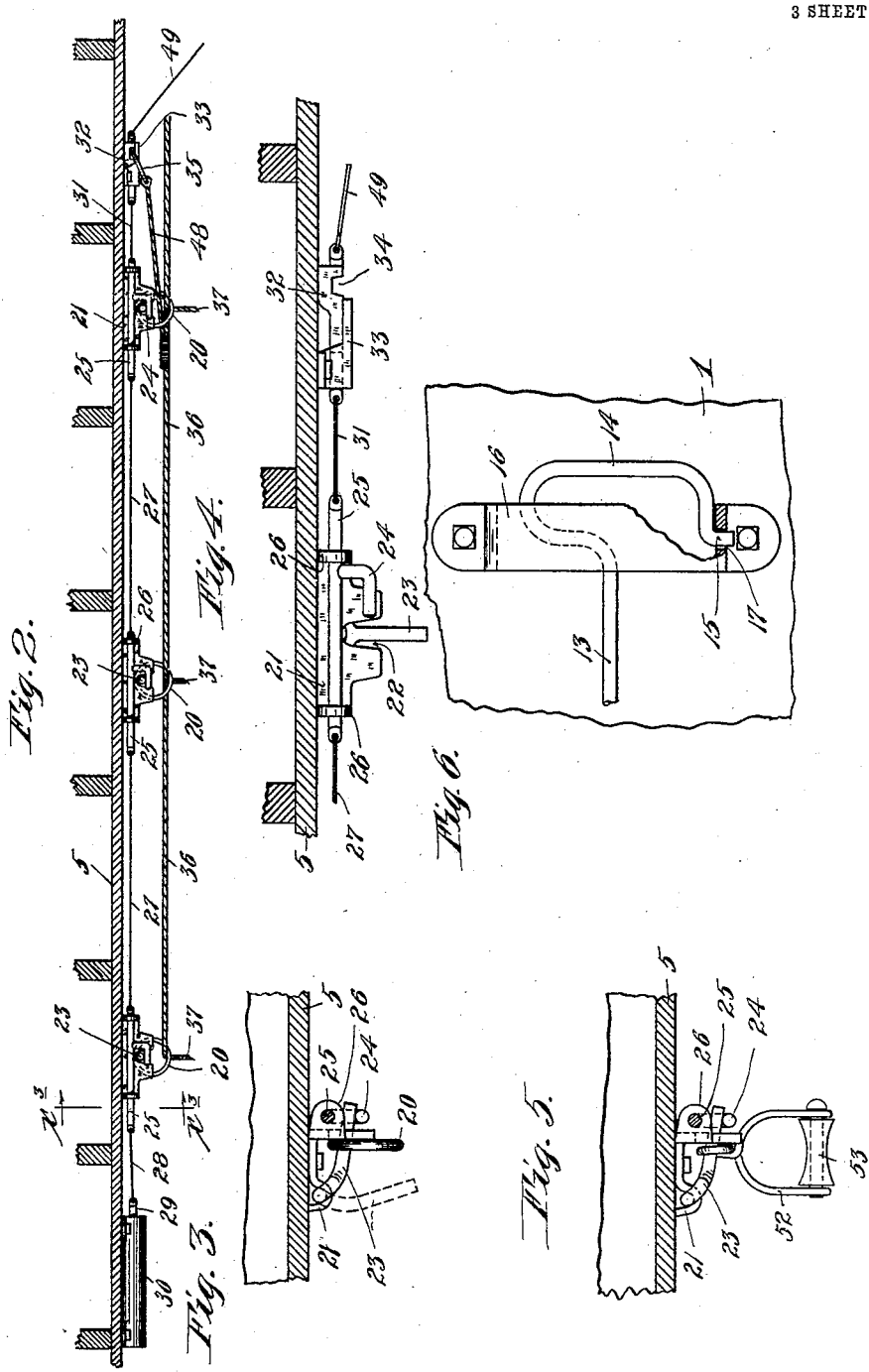
Witnesses.
E. W. Jeppesen.
A. H. Opsahl.
Inventor:
Elmer E. Higgins.
By his Attorneys.
Williamson Merchant

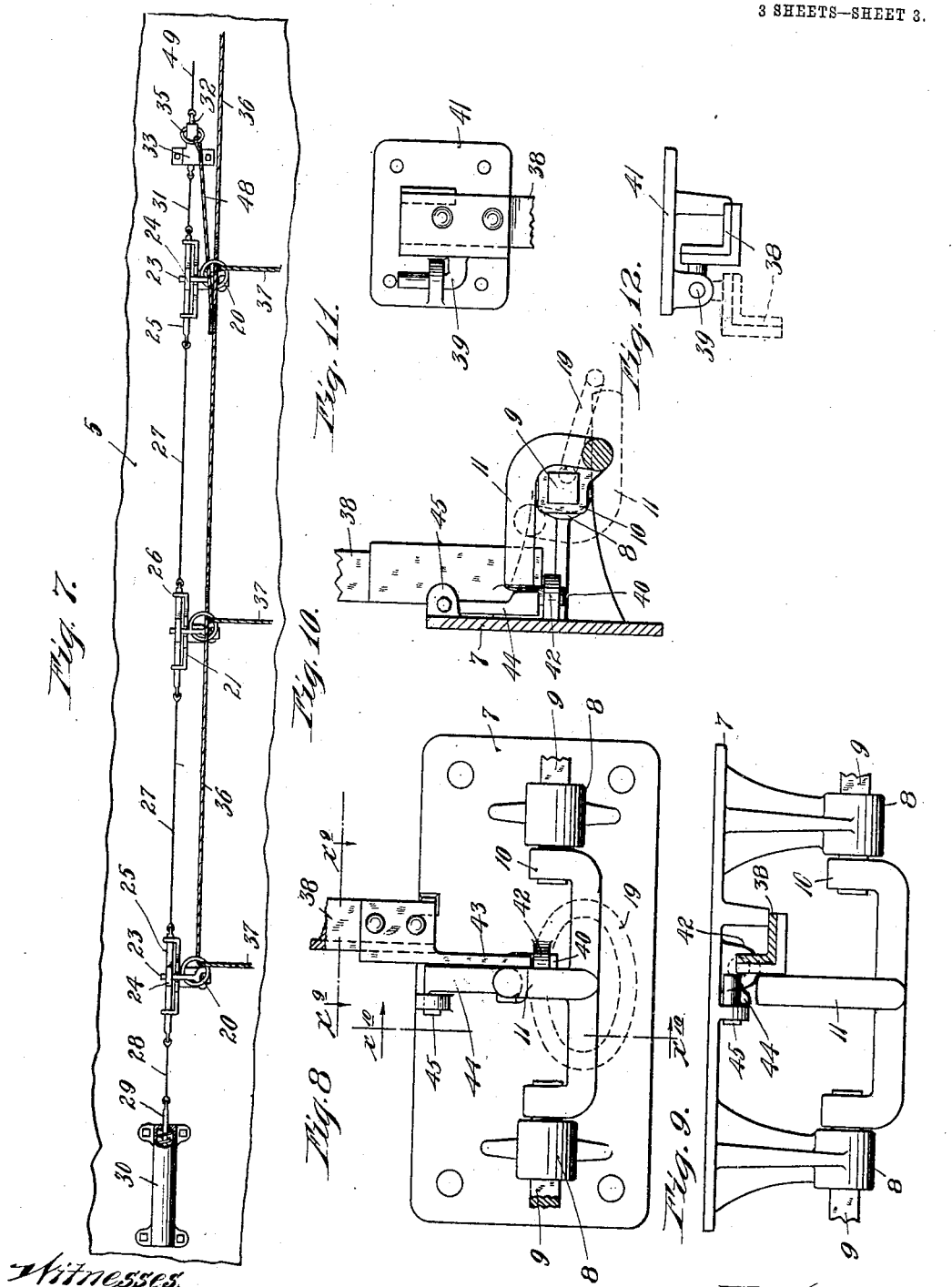

UNITED STATES PATENT OFFICE.

ELMER E. HIGGINS, OF ST. PAUL, MINNESOTA.

DEVICE FOR LEADING ANIMALS FROM BURNING BUILDINGS.

No. 813,496.     Specification of Letters Patent.     Patented Feb. 27, 1906.

Application filed February 20, 1905. Serial No. 246,583.

*To all whom it may concern:*

Be it known that I, ELMER E. HIGGINS, a citizen of the United States, residing at St. Paul, in the county of Ramsey and State of Minnesota, have invented certain new and useful Improvements in Devices for Leading Animals from Burning Buildings; and I do hereby declare the following to be a full, clear, and exact description of the invention, such as will enable others skilled in the art to which it appertains to make and use the same.

My invention has for its object to provide simple and efficient means for leading a large number of horses or other animals from a stable in case of fire; and to the above ends the invention consists of the novel devices and combinations of devices hereinafter described, and defined in the claims.

The great difficulty of removing horses and cattle from a burning barn is well known. Where there are a large number of such animals to be removed, a great many are almost certain to perish, as a great deal of individual effort is required to untie and lead each animal from the building. Furthermore, it is very dangerous to enter a stall with a horse crazed by fire, even where there is no great danger from the fire itself.

In accordance with my invention I provide means whereby without entering the stable, or without entering the same to any great distance, all of the horses or cattle within the several stalls may be released and then led from the stalls and out of the stable through one of the doorways thereof.

This device in its preferred form is illustrated in the accompanying drawings, wherein like characters indicate like parts throughout the several views.

Figure 1 is a perspective view illustrating my improved apparatus or fire-escape applied in working position, the stalls and a portion of the barn to which it is applied being indicated by dotted lines. Fig. 2 is a vertical section taken on the line $x^2 x^2$ of Fig. 1. Fig. 3 is a transverse vertical section taken on the line $x^3 x^3$ of Fig. 2. Fig. 4 is a view corresponding to Fig. 2, but on a larger scale and showing the parts in different positions. Fig. 5 is a view corresponding to Fig. 3, but illustrating a slightly-modified form of one of the detachable line-guides. Fig. 6 is a detail illustrating the construction of the head of the releasing device and the latch therefor. Fig. 7 is a bottom plan view of the parts shown in Fig. 2. Fig. 8 is a detail in front elevation, illustrating the construction of one of the hitching devices. Fig. 9 is a horizontal section on the line $x^9 x^9$ of Fig. 8. Fig. 10 is a vertical section on the line $x^{10} x^{10}$ of Fig. 8. Fig. 11 is a detail in front elevation, showing the upper portion of one of the guard-sheaths; and Fig. 12 is a plan view of the parts shown in Fig. 11.

The numeral 1 indicates one wall of the barn, the same having the ordinary door-opening 2, and the numeral 3 indicates the partitions of the several stalls, the same having the usual mangers 4, all of which parts are indicated by dotted lines in Fig. 1. In Figs. 2, 3, 4, 5, and 7 the numeral 5 indicates the ceiling of the barn, the same being indicated by full lines.

To the wall or partition 6 of the barn, just above the several mangers 4, are rigidly secured bearing-plates 7, having projecting bearing-lugs 8, in which are loosely journaled the sections 9 of a rock-shaft, the said rock-shaft having between the lugs 8 of the several plates 7 crank-like coupling-sections 10, that rigidly unite the several sections of the said rock-shaft. These crank-like sections 10 are provided with laterally-projecting hooks 11, that normally stand as indicated in Figs. 1, 8, 9, and 10 by full lines. To one end of the sectional rock-shaft made up of the parts 9 and 10 is secured a short arm 12, to which is pivoted a releasing-bar 13, preferably formed at its free end with a handpiece 14, having a downturned end 15, affording one member of a latch. The said handpiece 14 is located, preferably, on the inside of the barn close to the door-opening 2, and, as shown, it works through a keeper-bracket 16, having a perforation 17, with which the latch member 15 engages to latch or lock the releasing rock-shaft against rotation and the hitching-hooks 11 in the operative positions indicated.

The tie-straps 18 of the halters are tied to hitching-rings 19, which "rings," so called, may take any suitable form and to hitch the horses in the stalls are applied to the hitching-hooks 11 of the releasing rock-shaft.

A plurality of overhead guide-rings 20, which rings may take any suitable form, are supported from the ceiling of the barn at the rear of the several stalls—that is, one at the rear of each stall. These guide-rings 20 are detachably supported by a device of novel construction preferably arranged as follows: Rigidly secured to the ceiling of the barn in proper positions to support the several guide-rings 20 are brackets 21, formed with notches 22 and provided with pivoted detaining-arms 23, that are passed through the said rings 20 to normally hold the same in position. The free ends of the detaining-arms 23 project through the notches 22 of the corresponding brackets 21 and are held in working positions by crooked fingers or lock-bolts 24, carried by sliding bars or plungers 25, mounted in lugs 26 on the respective brackets 21. The several plungers 25 are connected, preferably, by wires 27, and the inner end of the innermost plunger is, as shown, connected by a wire 28 to a spring-pressed plunger 29, mounted in a box 30, rigidly secured on the ceiling, as best shown in Figs. 2 and 7. The spring-pressed plunger 29 acting through the connections described normally holds the fingers 24 in their operative positions, (shown in Figs. 1, 2, and 7,) thereby normally holding the guide-rings 20 in operative positions.

To the outer end of the outermost plunger 25 a light rod or wire 31 is attached, and this wire is attached to the inner end of a slide or trip plunger 32, mounted in a keeper 33, secured on the ceiling. By the spring-pressed plunger 29 the trip-plunger 32 is normally held in the position indicated in Figs. 2 and 7, in which positions a notch 34 thereof coöperates with the bottom portion of the keeper 33 to securely hold a ring 35, the purpose of which will presently appear.

To lead the several horses from the barn, I provide a main lead-line 36, having a plurality of branch lines 37. This main lead-line, which may be in the form of a rope, cable, wire, strap, or other flexible connection, is passed through the several detachable guide-rings 20, and its branch lines 37 extend one through each of said rings. From the several guide-rings 20 the branch lines 37 extend along under the ceiling over the stalls to the front wall 6 of the stalls, thence vertically downward, and at their lower ends are attached one to each of the detachable hitching-rings 19.

To protect and support those portions of the branch lines 37 that extend vertically along the inner surface of the wall 6, hinged sheaths 38 are provided. These sheaths are preferably formed of angle-iron, and at their upper and lower ends they are provided with offset hinge-trunnions 39 and 40, respectively. The trunnions 39 are loosely mounted in lugs of bearings 41, rigidly secured to the wall 6, while the trunnions 40 are loosely mounted in lugs 42 on the heretofore-noted bearing-brackets 7. As is evident, any tension on the branch lines 37 will tend to move the hinged sheaths 38 into open positions, (indicated by dotted lines in Fig. 12,) thereby releasing said branch lines from their respective sheaths. In the normal position of the parts, however, the sheaths are held in their operative positions indicated in the drawings, this being accomplished by engagement of the ends of the hitching-hooks 11 with depending portions 43, secured to the respective sheaths 38. (See particularly Figs. 9 and 10.) A gravity-held dog 44 is pivoted at 45 to each bracket 7 in such position that it will normally stand as indicated in Figs. 8 and 10, in which position it will perform no function whatever. These dogs 44 are serviceable in setting the apparatus for holding the sheaths 38 in operative positions temporarily when the hitching-hooks 11 are turned into releasing positions. (Indicated by dotted lines in Fig 10.) To render the dogs 44 temporarily operative for the purpose just noted, they are turned into horizontal positions, in which positions they will prevent releasing movements of the sheaths 38 and in turn will be temporarily frictionally held by pressure thereon from the depending portions 43 of the respective sheaths due to tension on the sheaths from the respective branch lines 37.

The outer end of the main lead-line 36 is preferably provided with a hand-ring 46, which may be conveniently hung on a hook 47, located near the doorway 2. The ring 35, before described, is connected by a short line or flexible connection 48 to the main lead or line 36. This line-section 48 normally stands approximately as indicated in Figs. 2 and 7 and should be in length approximately such that when the lead-line is drawn upon the horses will be led to the rear ends of the stalls before it is drawn taut in the direction reversed from that indicated in Figs. 2 and 7.

For additional safety a short line 49 is attached to the tripping-plunger 32. As shown this line 49 is provided with a ring 50, which may be conveniently hung on a hook 51 near the doorway 2.

The operation of leading the horses from the barn is substantially as follows: First, by raising and then drawing on the releasing-rod 13 the sectional rock-shaft 9 10 is rocked and the hitching-hooks 11 are turned into releasing position, (indicated by dotted lines in Fig. 10,) thereby releasing the several hitching-rings 19, which then remain attached only to the lower ends of the respective lead-lines 37. This movement of the hitching-hooks 11 releases the sheaths 38, permitting them to swing on their trunnions 39 and 40, and thereby release the said branch lines whenever tension is put upon the same. Then by drawing on the outer end of the lead-line 36 the several horses hitched to the branch lines thereof are led from the stalls into the aisle or passage-way back of the stalls. As so far described and up to this time the guide-rings 20 have been held in operative position; but under continued movements of the lead-line the short connecting-line 48 will be drawn taut in the direction indicated toward the right with respect to Fig. 2 and by pulling on the ring will draw the plunger 32 toward the doorway until its notch 34 will be carried beyond the bottom plate of the keeper 33, thereby releasing said ring 35. This movement of the releasing-plunger 32 moves all of the connected plungers 35 and carries their fingers 24 into the inoperative positions indicated in Fig. 4, thereby releasing the detaining-levers 23 and dropping the several guide-rings 20. This having been done, the main lead-line, its branch lines, and all parts permanently connected thereto are released, so that the horses may be led from the barn. The line 49 is provided, as already stated, simply for additional safety and affords means for releasing the several guide-rings 20 independently of the action of the lead-line.

In Fig. 5 the detachable guide-rings are afforded by yokes 52, provided with antifriction-rollers 53, the said yokes being adapted to be held by the detaining levers or arms 23 in the same manner as the rings 20.

As a means for leading a large number of horses at one time from a barn, the apparatus above described has in practice been found extremely efficient for the purposes had in view. The value of a device of this character will be readily appreciated without any further comment. The device is simple, reliable in its action, and may be installed at a comparatively small cost.

From what has been said it will be understood that the device described is capable of many modifications within the scope of my invention as herein set forth and claimed.

The several so-called "branch" lead-lines 37 might all be carried through the guiding device described and be brought to the operating station or point near the doorway of the barn; but this arrangement would be the equivalent of the main lead-line having a plurality of branches and would be within the scope of the claims of this application.

What I claim, and desire to secure by Letters Patent of the United States, is as follows:

1. In a device of the character described, the combination with a main lead-line having a plurality of branch lines extending into the stalls and provided with devices to which the horses may be hitched, locks for locking and releasing said branch lines, a releasing connection for said locks extending to a distant point, guides for said branch lines located at the rear portions of the stalls, and a connection between said lead-line and said rear guides, for releasing the latter, substantially as described.

2. In a device of the character described, the combination with a main lead-line having a plurality of branch lines extending into the several stalls and provided with devices to which the horses may be hitched, locks for locking and releasing said branch lines, means for operating said locks from a distant point to release said branch lines, guides for said branch lines in the form of rings, detaining devices normally holding said rings at the rear of the respective stalls, and connections between said main lead-line and the several detaining devices for operating the same to release the several guide-rings, under a movement of said main lead-line, substantially as described.

3. In a device of the character described, the combination with a main lead-line having a plurality of branch lines extending into the several stalls and provided with rings to which the horses may be hitched, locks normally holding said rings, means for operating said locks to release said hitching-rings, hinged sheaths normally holding said branch lines in position, themselves held in operative positions by the respective ring-holding locks and arranged to be released when said locks are actuated to release said hitching-rings, substantially as described.

4. In a device of the character described, the combination with detaining-latches located at the rear of the stalls, and guide-rings normally held thereby, of a main lead-line and branch lead-lines working through said guide-rings, said branch lines having, at their ends, hitching-rings, a rock-shaft having a plurality of hitching-hooks acting as locks, located at the front of the stalls and normally holding said hitching-rings, means for rocking said shaft to release the several hitching-rings, and a connection between said main lead-line and the several detaining-latches for releasing the several guide-rings, under a movement of said lead-line required to lead the horses from the building, substantially as described.

5. In a device of the character described, the combination with a main lead-line having a plurality of branches extending into the several stalls and provided with devices to which the horses may be hitched, of guides for the several branch lines arranged to be released by a movement of said lead-line, substantially as described.

In testimony whereof I affix my signature in presence of two witnesses.

ELMER E. HIGGINS.

Witnesses:
J. W. LANSING,
F. D. MERCHANT.